United States Patent [19]
Meirowitz

[11] 3,950,989
[45] Apr. 20, 1976

[54] DC TO FREQUENCY CONVERSION CIRCUIT

[76] Inventor: Richard L. Meirowitz, 135-10th St., Hicksville, N.Y. 11802

[22] Filed: July 30, 1974

[21] Appl. No.: 493,088

[52] U.S. Cl. ............................ 73/231 R; 73/194 E; 307/271
[51] Int. Cl.² .......................................... G01F 1/05
[58] Field of Search ............ 73/231 R, 231 M, 229, 73/194 M, 194 EM, 194 E; 307/271, 235 R; 328/128, 151

[56] References Cited
UNITED STATES PATENTS

| | | | |
|---|---|---|---|
| 3,504,267 | 3/1970 | James et al. ................... | 307/271 X |
| 3,635,084 | 1/1972 | Lamphere et al. ............ | 73/194 M X |
| 3,835,419 | 9/1974 | Milne et al. ................... | 307/271 X |

*Primary Examiner*—Richard E. Aegerter
*Assistant Examiner*—Michael H. Thaler

[57] ABSTRACT

A circuit for converting an input DC value to a pulse signal of a given frequency, and including an integration circuit which receives as its input a composite DC signal which includes the DC value, and provides an integrated output therefrom. A hysteresis amplifier receives the integrated output, and in response thereto provides a binary output signal. A switching device having two states receives the binary output signal, and in response thereto, respectively switches between its two states. A pulse generating circuit is coupled to the switching device and produces a sequence of fixed pulses at a predetermined, noncritical rate. The switching device only permits the fixed pulses to be transmitted during one of its states. An output circuit which includes a counting device is coupled to the switching means and receives the fixed pulses which are transmitted by the switching device and counts them. A frequency to DC conversion circuit is coupled in a feed back arrangement between the switching device and the integration circuit for converting into a DC level the average pulse rate which the switching devices transmits. The DC level in conjunction with the input DC value forms the composite DC signal. The total number of pulses counted per unit time will depend upon the composite DC signal. In a specific embodiment, the DC to frequency conversion circuit is incorporated in a fuel flow system for providing a pulse count output representing the amount of fuel consumed.

The aforementioned Abstract is neither intended to define the invention of the application which, of course, is measured by the claims, nor is it intended to be limiting as to the scope of the invention in any way.

13 Claims, 8 Drawing Figures

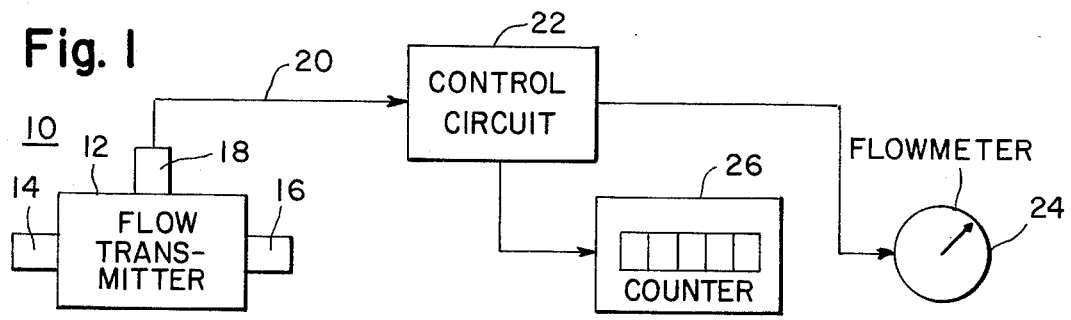
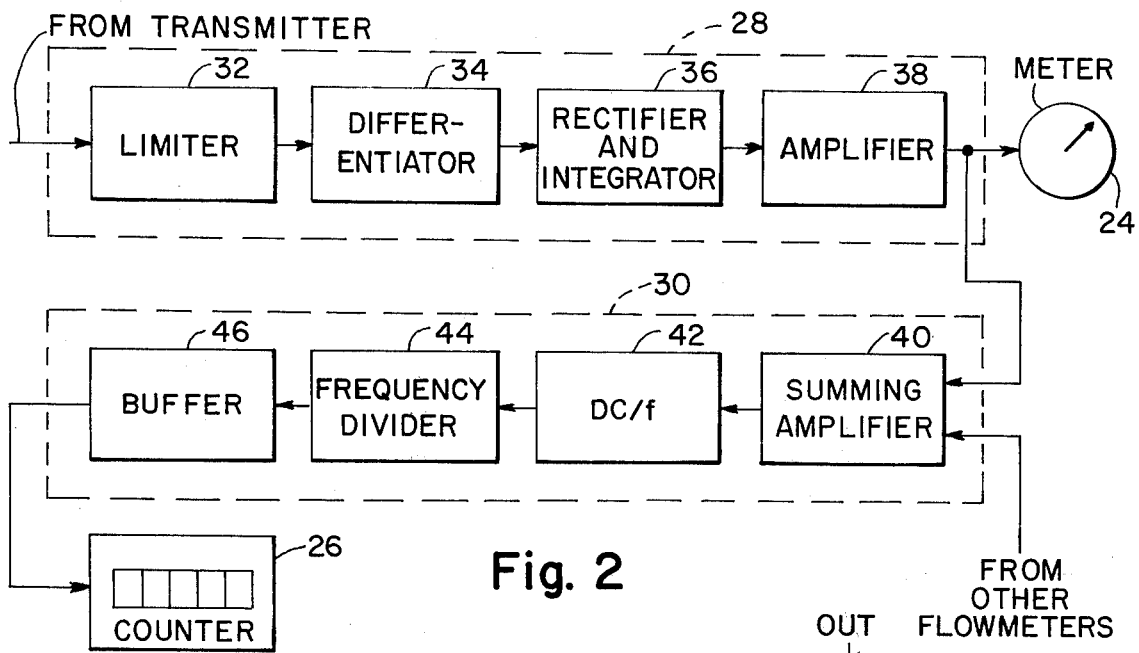
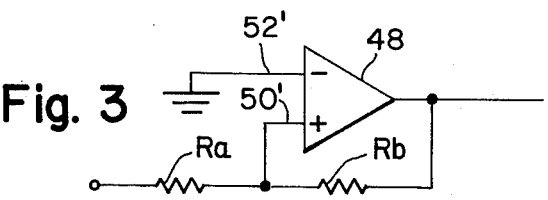
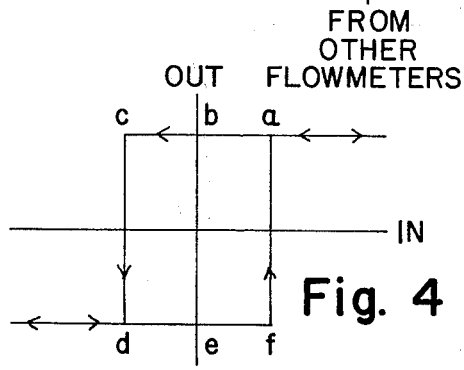
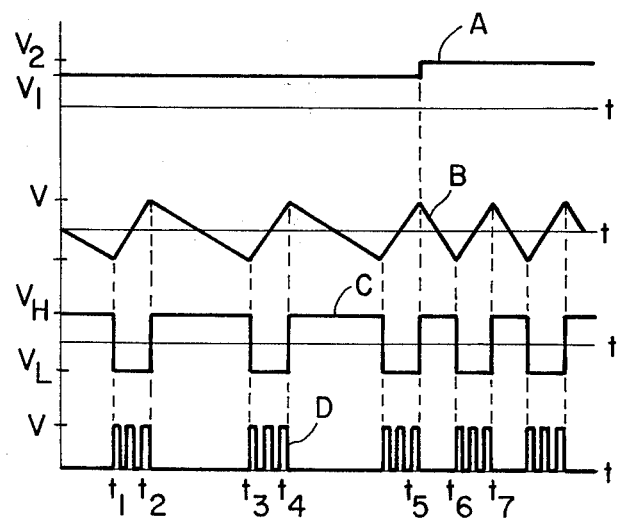

DC TO FREQUENCY CONVERSION CIRCUIT

BACKGROUND OF THE INVENTION

This invention relates to a DC to frequency conversion circuit and particularly to such a circuit which provides an output which is an integrated function of the input.

During the course of measurement procedures there is frequently provided a DC value wherein the magnitude is representative of the variable being measured. In order to provide a digital count of this variable, it is necessary to convert the DC value into a pulse signal having a fixed average frequency. The pulses can then be counted and the count will provide the desired indication. Such requirements are frequently encountered in telemetry systems where the sensor provides a DC level output and the central station must provide a digital readout on a digital counter. In most cases, digital equipment is utilized for providing the conversion from DC to a pulse signal for digital counting. However, as is generally recognized, digital equipment is exceedingly complex and expensive and is hard to service as well as costly to replace. Analog circuits can also be used for this purpose, such as a voltage controlled oscillator where the DC level is converted into a pulse frequency output. However, such analog devices frequently require numerous components to form and shape the desired pulse output and is generally not accurate enough for most applications.

By way of example, one application which finds use of a DC to frequency conversion circuit is in connection with a fuel flow system for aircraft use. Such fuel flow systems typically include a turbine flow transmitter which is placed in the fuel line and provides an output frequency which is a function of the volume of fluid passing through the transmitter. The frequency is subsequently converted into a DC level representing the flow rate which is displayed on an indicator. However, if the total amount of fuel consumed is to be indicated on a digital counter, it is necessary to convert the DC level into a pulse signal. Since the pulse signal is to be representative of the amount of fuel consumed, it will be necessary for the DC to frequency converter to integrate the value while performing the conversion. Thus, the DC level represents a flow rate as a function of time, and the digital output must represent amount of fuel consumed, which is an integral of the flow rate.

SUMMARY OF THE INVENTION

It is therefore, an object of the present invention to provide an improved DC to frequency conversion circuit which avoids the aforementioned problems of prior art devices.

yet a further object of the present invention is to provide a DC to frequency conversion circuit wherein the output is an integral of the input.

Still a further object of the present invention is to provide a DC to frequency conversion circuit which utilizes analog components.

A further object of the present invention is to provide a DC to frequency conversion circuit utilizing a hysteresis amplifier in conjunction with an integrating amplifier.

Still another object of the present invention is to provide a DC to frequency conversion circuit which includes a feed-back loop having an improved frequency to DC conversion circuit. Still a further object of the present invention is to provide a DC to frequency conversion circuit wherein the conversion factor can be modified within the circuitry. A further object of the present invention is to provide a DC to frequency conversion circuit utilizing analog components which is far more accurate than previously known similar circuits while at the same time less expensive and easier to service.

A particular object of the present invention is to provide an improved fuel flow system which utilizes a DC to frequency conversion circuit of an improved type.

A further object of the present invention is to provide a fuel flow system which is more accurate and less expensive than prior art devices.

These and other objects, features and advantages of the invention, will, in part, be pointed out with particularity and will, in part, become obvious from the following more detailed description of the invention, taken in conjunction with the accompanying drawings which form an integral part thereof.

Briefly, the invention comprises a circuit for converting a DC input value to a pulse signal, comprising an integration circuit for receiving a composite DC signal and providing an integrated output. A hysteresis amplifier receives the integrated output and in response thereto provides a binary level output signal. A switching device having two states, receives the binary level output signal and in response thereto respectfully switches between its two states. A pulse generator which produces a sequence of fixed pulses at a predetermined noncritical rate is coupled to the switch means such that the switch means only transmits pulses from the pulse generator during one of its states. An output circuit which includes a counter, is coupled to the switching device so that it receives the transmitted fixed pulses and counts them. Actually there is a 1/4096 count down circuit and the counter counts each 4096 pulses. A frequency to DC conversion circuit is coupled in a feed back arrangement between the switching device and the integration circuit wherein the transmitted pulses are converted into a DC level. This last mentioned DC level in combination with the DC input value to be converted forms the composite DC signal for the integration circuit. The total average number of pulses counted per second will depend upon the composite DC signal.

Additionally, said aforedescribed circuit is included within a fuel flow measuring system including, in combination, a turbine flow transmitter which is inserted in the fuel line of an aircraft and produces an output frequency representing the amount of fuel passing therethrough. A control circuit receives the output frequency and converts it into a DC value representing the flow rate of the fuel. A totalizing signal circuit, including the DC to frequency conversion circuit of the present invention, receives the DC value and produces an output pulse signal representing the total fuel consumed.

The pulse output of the totalizer represents the same thing as the pulse output of the flow turbine. Except that the pulse output of the turbine is not compensated for K factor and density.

BRIEF DESCRIPTION OF THE DRAWINGS

In the drawings:

FIG. 1 is a general block diagram of a fuel flow system;

FIG. 2 is a more detailed block diagram of the electronic circuitry of the fuel flow system shown in FIG. 1;

FIG. 3 is a circuit diagram of a hysteresis amplifier;

FIG. 4 is a plot of the transfer characteristic of the hysteresis amplifier shown in FIG. 3;

FIGS. 6A–6D show a series of waveforms useful in explaining the operation of the circuit shown in FIG. 5;

DETAILED DESCRIPTION OF THE PREFERRED EMBODIMENTS

Figure 5:
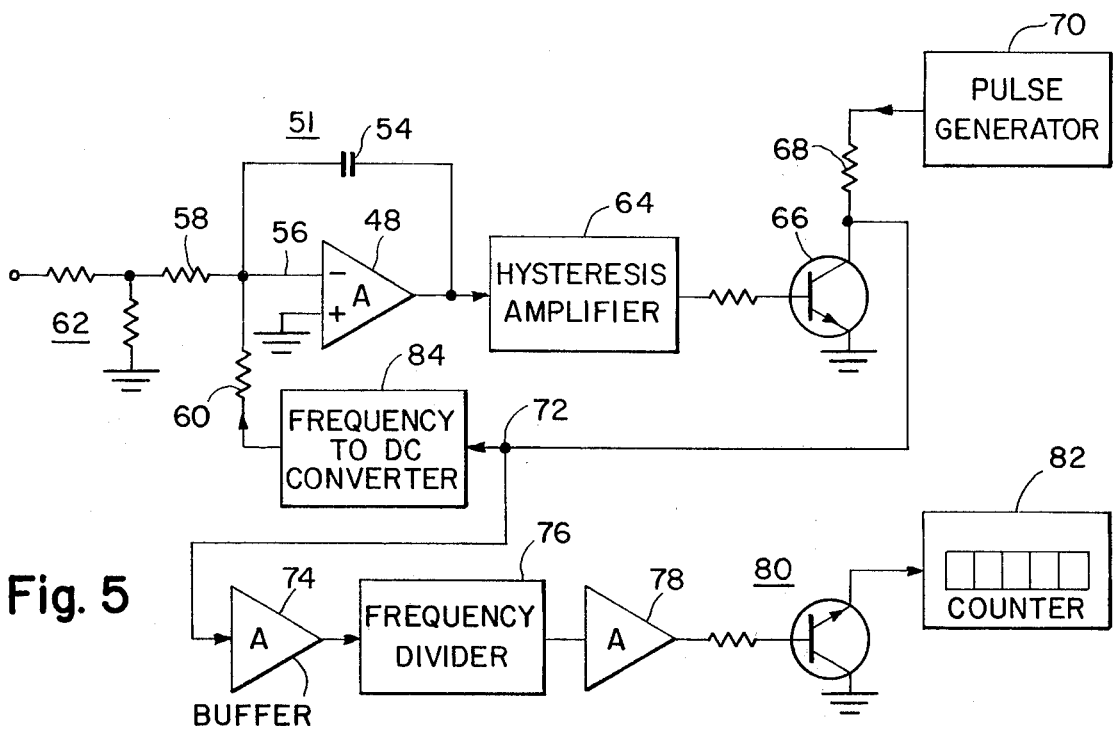
FIG. 5 is a circuit diagram of one embodiment of the DC to frequency conversion circuit in accordance with the present invention.

The invention describes a conversion circuit for converting a DC value to a pulse signal. Such conversion circuits find many applications in various fields to technology. However, in order to achieve a better understanding of the operation of the circuit, a fuel flow system will be described, by way of example, which includes the DC to frequency conversion circuit of the present invention. In this manner, a better understanding will be obtained of how the circuit operates and its features and details. However, it is understood that the fuel flow system is but one application of the present inventive conversion circuit and numerous other applications and systems could also utilize the present circuit.

Referring now to FIG. 1 there is shown a general block diagram of a fuel flow system which can be utilized for measuring the flow rate of a fuel in an aircraft, and which utilizes the conversion circuit of the present invention. The fuel flow system includes a fuel turbine flow transmitter, shown generally at 10, which measures the volume of a fluid as it flows through a passage in the transmitter. The flow transmitter typically includes a body 12 having appropriate fittings 14, 16 at its ends so that it can be included within a fuel line and having an output section 18. Internally, a rotor is coupled to a shaft which includes a turbine wheel. The flow of the fluid through the section 12 causes the turbine wheel to rotate at a speed proportional to the fluid volume per unit time. The number of turbine revolutions is therefore porportional to the volume of the fluid passing through the transmitter. Consequently, a count of the revolutions per unit of time will measure flow rate, and a count of total revolutions will measure total flow volume.

The output section 18 includes a signal pick off circuit having a magnet with a coil wound around the magnet. Connecting wire 20 interconnects the coil from the output section 18 to a control circuit 22.

As the rotor turns its motion is detected by the magnetic pick up coil. The rotor is typically positioned under the center line of the magnet and therefore lies within its magnetic field. Since the rotor material is magnetic, the magnetic field contracts and expands with every sweep of each blade. These changes of magnetic flux density generate an AC voltage signal whose frequency is linear with respect to flow.

The output from the pick up coil from the flow transmitter passes to the control circuit 22 which typically includes amplification devices which receive the output frequency of the flow transmitter. The amplifier output is shaped to provide a square wave which is then differentiated to produce a series of trigger pulses. These pulses are regulated to provide a number which will be proportional to the fuel rate. The pulses are then integrated to provide a DC signal which is applied to the fuel flow meter 24 which gives a flow rate indication. The indication can be a volumetric one, providing the number of gallons per unit time, or alternately, by introducing the density of the fuel as a factor in the control circuit 22, the flow meter 24 can indicate the mass fuel rate in pounds per unit time.

In addition to generating the DC output signal for driving the flow meter 24, a DC to frequency conversion circuit is included to provide a pulse output which drives the counter 26 to provide a measure of the integrated fuel flow rate. The number of pulses counted on the counter 26 can therefore provide an indication of the amount of fuel which has been consumed or, by utilizing appropriate substraction circuitry can also indicate the amount of fuel remaining. This indication can either be the volume of fuel or alternately the number of pounds of fuel.

Referring now to FIG. 2 there is shown a more detailed block diagram of the control circuit shown in FIG. 1. The output frequency from the fuel flow transmitter is sent to a first section shown within the upper dotted line 28 and referred to as a flow rate indicator section. This section converts the frequency into a DC value which is read on the meter 24 as the flow rate. The lower section included within dotted line 30 is a totalizing signal conditioner circuit which includes the DC to frequency conversion circuit of the present invention and provides a pulse output from the DC input signal. The pulse output drives the counter 26 and provides an indication of the amount of fuel consumed, or remaining.

In the flow rate indicator section 28, the input from the transmitter is first amplified and precision limited by means of limiter 32 to provide a square wave having a predetermined amplitude and time duration wherein the time duration is the same as that of the AC frequency signal provided by the flow transmitter. A characteristic of the limiter is typically to provide a sharp leading edge. The square wave from the limiter is then applied to a differentiating network 34 which can typically be made up of a stable capacitor and resistor. The time constant of the differentiating network 34 is made sufficiently smaller than the shortest half period to be expected so that the decay exponential waveform will have essentially gone to zero before the next pulse is generated. Differentiated pulses are then passed through a full wave rectifier and integrator 36 to obtain an average DC value of the pulses. The resulting DC signal, which is proportional to the input frequency, is applied to a meter amplifier 38 and then to the flow meter 24. The flow meter therefore provides the total flow rate of the fuel through the transmitter.

The DC signal is also sent to the totalizing signal conditioner circuit 30 and first enters into a summing amplifier 40 which also receives the DC values from other flow rate indicator circuits utilized within the same or other fuel lines. The resulting summed DC signal from the amplifier 40 is therefore proportional to the total flow rate. The amplified output is then applied to a DC frequency converter 42 which provides a pulse train output. The pulse train repetition rate is proportional to the total flow rate. After appropriate scaling in the frequency divider circuit 44, the pulses are sent to the counter 26 through a buffer driving circuit 46. Each count therefore represents a specific unit of fuel. The counter 26 can indicate the total number of gallons, or pounds of fuel, which have been consumed. The counter can also be set to indicate the amount of fuel remaining.

Although a digital counter could be used, it is preferable for aircraft use to utilize a mechanical pulse counter. Should a power failure occur, the digital counter would completely lose all memory and the count of fuel consumed would be completely wiped out. With a mechanical counter, even if a power failure should occur, the mechanical counter would retain its count and would only lose the few counts which occur during the power failure. However, for relatively short power failures this would hardly be a material error. The mechanical counter could also include a push button or other reseting means to initialize the counter at the beginning of flight to a predetermined initial value, typically zero.

The DC to frequency conversion circuit of the present invention utilizes a hysteresis amplifier. Such an amplifier is typically shown in FIG. 3 which includes an operational amplifier 48 having a grounded inverting input 52' and having the input applied to the non-inverting side 50' of the operational amplifier. The input signal is provided through a resistor R$a$. A feed back loop is provided between the output and the non-inverting input through a feed back resistor R$b$. If a positive voltage is applied at the input terminal 50', the input terminal 50' will be at a higher value than the input terminal 52' which is grounded. Therefore, the output will rise in the positive direction, and because of the feed back through the resistor R$b$, it will cause the positive input terminal 50 to move up to an even higher positive voltage. This latch up will continue to raise the output voltage until saturation of the operational amplifier is reached, at which point the output will keep at its fixed saturation value. If the positive input terminal 50' is then reduced to zero, the output will remain at its fixed saturation value therefore keeping the input from moving to a lower value. If the input is brought down past zero to a negative value, a sufficiently negative value will finally be reached where the input terminal 50' will be able to counter the feed back through R$b$ and will become negative with respect to input terminal 52'. At that point the output will reverse and will latch on to drive the input terminal 50 even more negative until the operational amplifier will saturate in the negative direction and the output voltage will remain at constant negative saturation value. The point at which the output voltage will reverse will depend upon the values of the resistors R$a$ and R$b$ When the voltage at the input terminal 50 is subsequently increased, it will finally reach a point in the positive direction where the output will reverse and again latch on until it will now saturate in the positive direction.

The aforediscussed operation of the circuit of FIG. 3 can be described in terms of its transfer characteristics, as shown in FIG. 4 where the input is drawn on one axis and the output on the other axis. Assuming that the operational amplifier is operating in its positive saturation mode at point $a$, as the input voltage is decreased it will continue past zero at point $b$ until a point $c$ is reached on the negative side which represents the low trip point. At that point the output voltage will latch on and will saturate in the negative direction at point $d$. When the input voltage is then increased, it will continue past the zero point $e$ until the upper trip point $f$ is reached, whereupon the output voltage will again latch on and saturate in the positive direction back up to $a$.

Referring now to FIG. 5 there is shown one embodiment of the DC to frequency conversion circuit in accordance with the present invention. An integration circuit, shown generally at 51 includes an operational amplifier 48 having a feed back loop in which is included a capacitor 54. One input of the amplifier is grounded and a composite DC input signal is provided to the the other input on line 56. The integration circuit 51 operates such that if a positive DC input signal is provided, the output will be a ramp signal having a slope determined by the input resistors 58, 60 and the capacitor 54. The rate also depends upon the level of the composite input DC signal. For a higher composite DC input, the rate of the output signal will increase faster. The DC value to be converted is applied through an attenuator 62 to reduce the effect of the DC value upon other DC levels in the system. The DC value to be converted passes through the resistor 58 and is applied on line 56 to the integration circuit. The output from the integration circuit passes through the hysteresis amplifier 64, of the type shown in FIG. 3. The output from the hysteresis amplifier passes to a switching circuit shown generally at 66, and including a transistor shown as NPN transistor having its emitter grounded and further including a collector resistor 68 to which is coupled a pulse generator 70. The collector is also coupled to a junction point 72 to which is connected and ouput circuit including a buffer 74, a frequency divider 76, a further buffer 78 and a driving circuit 80 which drives the counter 82. Also coupled to the point 72 is a frequency to DC convertor 84 connected in a feed back loop arrangement to provide a DC signal. This last mentioned DC signal passes through resistor 60 and combines with the DC value at resistor 58 to form the composite DC input signal along line 56 to the integration circuit 50.

The operation of the DC to frequency convertor shown in FIG. 5 will be better understood with reference to the wave forms shown in FIG. 6. FIG. 6a represents the DC value which is to be converted to a pulse signal. The DC value is shown as $V_1$ and this signal is applied to the integration circuit 51, the output of which is represented by a negative going ramp which continues decreasing at a rate determined by the input value $V_1$. The negative going ramp is sent to the hysteresis amplifier 64. As the ramp continues negative, the lower trip point of the hysteresis amplifier will be reached at time $t_1$, whereupon the output of the hysteresis amplifier will saturate in the negative direction to produce an output value of $V_L$. This negative value will be such as to turn the transistor 66 off thereby removing the short circuit from the pulses produced at the output of the pulse generator. The pulses from the pulse generator will then be permitted to the point 72. The pulses from the pulse generator 70 have a fixed time duration and occur at a fixed rate. This is not a necessary condition for this application which is advantageous in that the pulse generator need not be stable. The pulses will pass to the frequency to DC convertor 84 which produces an average DC output signal. This signal is a negative signal and its magnitude is substantially greater than the magnitude of the positive DC value input signal which is being converted. The negative going signal from the frequency to DC converter 84 combines with the positive DC value to form the mposite signal which will therefore be negative. This gative composite DC signal entering the integration cuit 51 will now cause the integration circuit to arge in the positive direction at a rate generally faster en the rate at which it previously proceeded in a gative direction. The positive going slope at the output of the integration circuit will enter the hysteresis iplifier and as the rate continues past the zero point o the positive direction a point will be reached at ie $t_2$ which represents the upper trip of the hysteresis iplifier. At that point, the hysteresis amplifier output l represent the value $V_H$ which is the positive saturan value of the amplifier. The value $V_H$ will be sufficient to turn on the transistor 66 such that the pulses em the pulse generator will now be shorted to ground d will no longer appear at the frequency to DC conter. Therefore, there will not be any negative output $\vdots$ voltage from the frequency to DC converter 84, d the only input to the integration circuit 51 will be : positive DC value from resistor 58. The integration cuit will therefore produce a negative going slope ich will continue going negative until a time $t_3$, when : lower trip point of the hysteresis amplifier is again iched. At this point the hysteresis amplifier will again iduce its negative saturation value $V_2$ which will iin cause the pulse generator to send its pulses to the quency to DC converter, being a negative going nal will cause the integration circuit to charge in a sitive direction and the cycle will continue. It is ied, that the duration $t_1–t_2$ and $t_3–t_4$ during which the tput from the frequency to DC converter is present ising the integration circuit to charge positively, is of istantially the same duration. This is because the tput from the frequency to DC converter is control- $\xi$ over the DC input value. Therefore, the same num- of fixed pulses from the pulse generator will pass ring this time duration. It is to be noted that the ses need not be periodic.

f the DC value to be converted, increases at a time iwn as $t_5$, the effect will be that during the time the : value is applied alone to the integration circuit 51, : output from the integration circuit will charge in a ;ative direction at a faster rate than before. Thus, it ioted that between the time, $t_5$ and $t_6$, the negative ng slope is substantially faster than was the slope ween the times $t_2$ and $t_3$. However, because the ;ative output from the frequency to DC converter is istantially greater than the input DC value, the composite signal will still be substantially the same as bee and the same number of fixed pulses from the se generator 70 will pass to cause the positive going pe between time $t_6$ and $t_7$ to be substantially the ie as the positive slope between time $t_3$ and $t_4$. The ed number of pulses which pass during the positive ng slope of the integration circuit represents a fixed up of pulses referred to as a single unit. This unit is istantially the same for all values of DC levels being iverted. However, it is noted, that the average repeon rate of the unit will be greater for a higher DC ue, and the repetition rate will be smaller for a lower : value. If, for example, a single count were provided each of the units, there will be a greater number of ses occurring within a fixed period of time for a her DC value. If, for example, the DC value were to resent the flow rate of a fuel through a flow transter, the number of pulses would therefore represent total amount of fuel consumed during that period of e.

In addition to having the pulses fed through a frequency to DC converted 84, the pulses are also fed into a frequency divider 76 which is isolated with buffer circuits on either side. The frequency divider is used to scale down the number of pulses. Typically, a frequency divider can be utilized made of an integrated circuit such as a 4096 bit circuitchip which counts down 4096 pulses to a single pulse count which is sent to the counter 82. The frequency to DC converter 84 can be set with an appropriate gain to utilize a specific frequency divider.

The amplifier utilized in the integration circuit is a very high gain amplifier, typically approaching an infinite gain. If there is any error between the two inputs forming the composite DC input signal, the integrator continues to integrate until saturation is reached. If it integrates anywhere outside the upper trip point, or outside the lower trip point, packages of pulses will be generated which will correct the error between the inputs, thus, the system is self-correcting.

Utilizing a specific frequency divider it is possible to obtain an output reading such that a single count represents a single unit of the information being measured, such as the fuel rate. Thus, the count down can be calibrated so that one pulse represents one pound of fuel.

Figure 7:
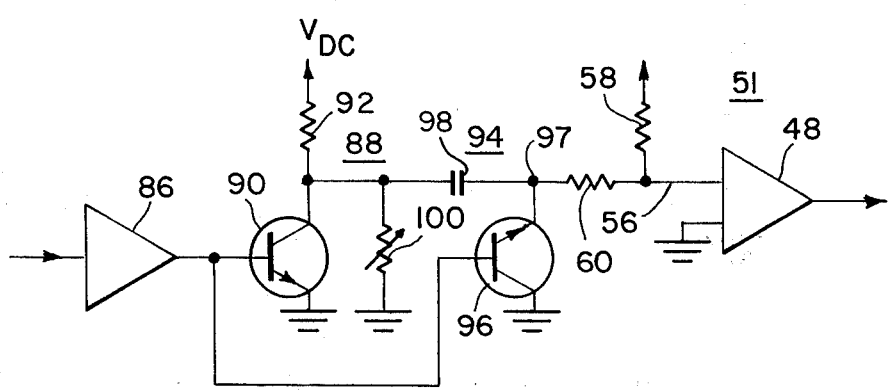
FIG. 7 is a circuit diagram of the frequency to DC conversion circuit utilized in the feed back arrangement of FIG. 5.

Referring now to FIG. 7 there is shown one embodiment of the frequency to DC converter which was shown generally at 84 in FIG. 5. The input frequency passes through a summing amplifier 86. The input frequency is the series of pulses from the pulse generator 70 shown in FIG. 5. The output from amplifier 86 passes through a first switching circuit, shown generally at 88, and including a transistor 90 whose emitter is grounded and whose collector is coupled through a resistor 92 to a DC voltage supply. The output from amplifier 86 also controls a switch shown generally at 94, and including a transistor 96 whose collector is shown grounded. A capacitor 98 is coupled between the collector of transistor 90 and the emitter of transistor of 96. A variable resistor 100 is coupled in parallel with the transistor 90. The emitter of transistor 96 is also coupled to resistor 60 which serves as one input to the integration circuit shown generally at 51 and including the operational amplifier 48. The DC value to be converted is passed through the resistor 58 which combines with the DC value through resistor 60 and forms the composite input signal along line 56, as was shown in FIG. 5.

Figure 8:
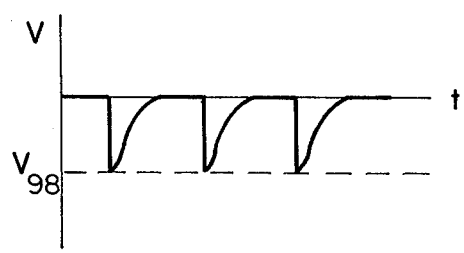
FIG. 8 is a waveform diagram useful in explaining the operation of the circuit of FIG. 7.

The transistors 90 and 96, being complementary transistors, operate in a complementary fashion. Thus, when transistor 90 is on, transistor 96 will be off and the reverse will also be true. When a pulse is received by amplifier 86 in a first direction, transistor 90 will be turned off and transistor 96 will be turned on. The capacitor 98 will therefore charge to the voltage $V_{DC}$. This voltage will remain across the capacitor 98. When an opposite going pulse is received at the amplifier 86, transistor 90 will be turned on and transistor 96 will be turned off. The voltage at the junction 97 will initially be the entire voltage of the capacitor 98 and will decay with a time constant determined by the resistor 60 and capacitor 98. FIG. 8 represents the voltage wave form across the resistor 60 whereby initially the voltage of $-V_{98}$ appears across the resistor 60 and decays with the time constant determined by the resistor and capacitor combination.

The voltage $V_{dc}$ shown in FIG. 7 is typically a zener controlled voltage. Since it is known that a zener diode is only rated generally within ±5% of its nominal value, in order to achieve a more accurate voltage at the capacitor 98, a voltage divider is formed between the fixed resistor 92 and the variable resistor 100. Thus, when a new zener diode is set into the voltage supply, the resistor 100 can be varied to keep the voltage across the capacitor 98 at a fixed value regardless of minor changes which may take place in the voltage supply. The voltage across the capacitor 98 can then be represented by the formula $$V_{DC} \times \frac{R_{100}}{R_{92}+R_{100}}$$

This will be the maximum voltage to which the capacitor 98 can charge. The wave form shown in FIG. 8 will repeat each time the input to the amplifier goes through zero. For a particular frequency of input, there will be produced an output wave form which repeats itself once for each cycle. The voltage across the resistor 60 will form part of the input of the integration circuit 50. This voltage will in fact be an average DC voltage since the integration circuit averages the pulses which are provided along line 56.

Although the DC to frequency conversion circuit hertofore described has been described in connection with a fuel flow system, it is to be understood that this is only by way of example, and that the DC to frequency conversion circuit can in fact be utilized for other applications as well.

There has been disclosed heretofore the best embodiments of the invention presently contemplated, however, it is to be understood that various changes and modifications may be made thereto without departing from the spirit of the invention.

What I claim as new and desire to secure by Letters Patent is:

1. A circuit for converting a DC value to a pulse signal comprising, integration circuit means receiving a composite DC input signal and providing an integrated output, hysteresis amplifier means receiving said integrated output and in response thereto providing a binary level output signal, switch means having two states and receiving said binary level output signal and in response thereto respectively switching between its two states, pulse generating means coupled to said switch means for providing a sequence of fixed pulses at a predetermined rate, said switch means transmitting said pulses only during one of its states, output circuit means including counting means coupled to said switch means for receiving said transmitted fixed pulses and counting them, and frequency to DC conversion means coupled between said switch means and said integration circuit means for receiving said transmitted pulses and converting them into a DC level, said DC level in combination with said DC value forming said composite DC input signal, whereby the total number of pulses counted is dependent upon said composite DC input signal.

2. The circuit as in claim 1 and wherein said integration circuit means is a feedback amplifier including a capacitor means in its feedback loop and wherein the output of said feedback amplifier is a ramp signal, the slope of which is controlled by said composite DC input signal.

3. The circuit as in claim 2 and wherein said hysteresis amplifier has a lower trip point which is less than zero volts, and an upper trip point greater than zero volts, such that when said ramp signal decreases to said lower trip point a negative level output signal is produced from said hysteresis amplifier and when said ramp signal increases to said upper trip point a positive level output signal is produced from said hysteresis amplifier.

4. The circuit as in claim 3 and wherein said DC value is a positive voltage and said DC level is a negative voltage and wherein the magnitude of said DC level is substantially greater than the magnitude of said DC value.

5. The circuit as in claim 4 and wherein the time duration of said one state of said switch means is substantially fixed and the time duration of the other state is essentially determined by said DC value, whereby the same number of fixed pulses are transmitted during each of said one state of said switch means, said fixed number of pulses establishing a pulse group, and whereby the frequency of occurrence of said pulse group is essentially determined by said DC value.

6. The circuit of claim 1 and wherein said output circuit further comprises frequency divider means for dividing down the number of transmitted pulses so that only a proportional amount will be counted.

7. The circuit of claim 1 and further comprising attenuation means for attenuating said DC value prior to its being combined with said DC level.

8. The circuit of claim 1 and wherein said frequency to DC conversion means further comprises amplifier means receiving said transmitted pulses, first switching means coupled to a fixed voltage supply and controlled by the output of said amplifier means for respectively switching between two states in response to said transmitted pulses, second switching means having the same two states and controlled by the output of said amplifier means to operate in opposition to said first switching means, capacitor means coupled between said first and second switching means, and resistor means coupled between said second switching means and said integration circuit means, whereby during one combination of states of said first and second switching means said capacitor means is charged to the voltage of said fixed voltage supply, and during the other combination of states said capacitor means discharges through said resistor means.

9. The circuit as in claim 8 and wherein said fixed voltage supply is zener controlled voltage and wherein said frequency to DC conversion circuit further comprises fixed resistor means serially connected between said voltage supply and said first switching means and variable resistor means coupled across said first switching means, wherein said fixed resistor means and said variable resistor means form a voltage divider whose output voltage is controlled by said variable resistor means, and wherein said capacitor means charges to the output voltage of said voltage divider.

10. The circuit as in claim 1 and wherein said output circuit means further comprises buffer circuit means for isolating said counting means.

11. A fuel flow measuring system comprising, in combination, turbine flow transmitter means adapted to be inserted in a fuel line and producing an output frequency representing the amount of fuel passing therethrough, control circuit means receiving said output frequency and converting it into a DC value representing the flow rate of the fuel, and totalizing signal circuit means receiving said DC value and producing a pulse signal representing the total fuel consumed, and wherein said totalizing signal circuit means further comprises:

- integration circuit means receiving a composite DC input signal and providing an integrated output, hysteresis amplifier means receiving said integrated output and in response thereto providing a binary level output signal;
- switch means having two states and receiving said binary level output signal and in response thereto respectively switching between its two states;
- pulse generating means coupled to said switch means for providing a sequence of fixed pulses at a predetermined, not necessarily periodic rate, said switch means transmitting said pulses only during one of its states;
- output circuit means including counting means coupled to said switch means for receiving said transmitted fixed pulses and counting them; and
- frequency to DC conversion means coupled between said switch means and said integration circuit means for receiving said transmitted pulses and converting them into a DC level, said DC level in combination with said DC value forming said composite DC input signal, whereby the total number of pulses counted is dependent upon said composite DC input signal.

12. The circuit as in claim 11 and wherein said counting means is a mechanical counter including reset means for setting the count of the counter to a predetermined value.

13. The circuit as in claim 12 and wherein said totalizing circuit means further comprises summing amplifier means for combining the outputs of at least two control circuit means.

* * * * *